United States Patent [19]

Yamazaki

[11] Patent Number: 5,886,427
[45] Date of Patent: Mar. 23, 1999

[54] LOW SIGNAL LOSS TYPE HOT STAND-BY SWITCHING UNIT

[75] Inventor: Masao Yamazaki, Tokyo, Japan

[73] Assignee: NEC Corporation, Tokyo, Japan

[21] Appl. No.: 969,577

[22] Filed: Nov. 13, 1997

[30] Foreign Application Priority Data

Nov. 18, 1996 [JP] Japan ................................ 8-306581

[51] Int. Cl.$^6$ .............................. H01H 1/04; H02B 1/24
[52] U.S. Cl. .......................... 307/112; 307/116; 307/125; 307/130; 307/131
[58] Field of Search ................................. 307/112, 116, 307/126–131; 361/160, 139; 324/500, 511, 520, 522

[56] References Cited

U.S. PATENT DOCUMENTS

| | | | |
|---|---|---|---|
| 3,996,533 | 12/1976 | Lee | 333/7 |
| 4,283,684 | 8/1981 | Satoh | 330/277 |
| 4,853,972 | 8/1989 | Ueda et al. | 455/83 |
| 4,980,812 | 12/1990 | Johnson, Jr. et al. | 363/44 |
| 5,054,114 | 10/1991 | Erickson | 455/78 |
| 5,359,463 | 10/1994 | Shirochi et al. | 360/19.1 |
| 5,469,001 | 11/1995 | Vaillant | 307/113 |
| 5,475,875 | 12/1995 | Katsuyama et al. | 455/275 |
| 5,778,306 | 7/1998 | Kommrusch | 455/78 |
| 5,825,227 | 10/1998 | Kohama et al. | 327/308 |

FOREIGN PATENT DOCUMENTS 2-268024  11/1990  Japan ............................... H04B 1/74

*Primary Examiner*—Jeffrey Gaffin
*Assistant Examiner*—Peter Zura
*Attorney, Agent, or Firm*—Whitham, Curtis & Whitham

[57] ABSTRACT

A hot stand-by switching unit for a receiving apparatus including regular and a protection receiver comprises a branch circuit and a control circuit. The branch circuit consists of a coupler and a high-frequency switching unit. The high-frequency switching unit is controlled by the control circuit and supplies a low loss output of the coupler to the regular receiver and a high loss output of the coupler to the protection receiver. When the regular receiver breaks down, the high-frequency switching unit supplies the low loss output of the coupler to the protection receiver and the high loss output of the coupler to the regular receiver.

3 Claims, 2 Drawing Sheets

LOW SIGNAL LOSS TYPE HOT STAND-BY SWITCHING UNIT

BACKGROUND OF THE INVENTION

1. Field of the Invention

The present invention relates to a hot stand-by switching unit for a receiving apparatus composed of a regular and a protection receiver.

2. Description of the Related Art

In a switching unit of this kind, a hybrid type branch method has hitherto been adopted. For example, as shown in FIG. 1, a hybrid unit 12 is provided on the input side of a regular receiver 3 and a protection receiver 4, and a switching circuit 6 is provided on the output side thereof. Input signals are branched by hybrid unit 12 and are supplied to regular receiver 3 and protection receiver 4. Switching circuit 6 on the output side is switched by control circuit 13 which operates according to monitor signals of regular receiver 3 and protection receiver 4, and secures the reception of signals by selecting the protection receiver when the regular receiver breaks down.

As shown in FIG. 2, there is another conventional technique, in which a branch circuit 11 composed of PIN diode 8, 9 is disposed as a branch circuit and by controlling a bias current, it varies a degree of coupling with regular and protection receivers 3, 4 (Japanese Patent Laid-open. 268024/90). Specifically, when regular receiver 3 is normal and switching circuit 6 selects the regular receiver, the high-frequency resistance of PIN diode 8 is maintained at a high level without the bias current flowing through PIN diode 8 in order to keep the signal loss to be given to regular receiver 3 to a minimum. At the same time, a fixed amount of the bias current is passed through PIN diode 9 to maintain a leak of a certain amount, for example, about 10 dB to secure self monitoring of its own operation in protection receiver 4.

When regular receiver 3 breaks down, control circuit 10 switches switching circuit 6 according to the monitor signal of regular receiver 3 to select protection receiver 4. At this time, by flowing the bias current of a reverse condition against the above in PIN diodes 8, 9 in branch circuit 11, it becomes possible to suppress the insertion loss of protection receiver 4 to a minimum.

With the above conventional hot stand-by switching unit shown in FIG. 1, since hybrid unit 12 is used to branch received signals and the hybrid unit produces at least 3 dB branch loss, it causes a large degree of deterioration with reference to the performance of the system. Therefore, in the case of a receiving circuit having a protection receiver, compared with a receiving circuit having no protection receiver, signal input to the receiver is reduced by the loss due to the hybrid unit, here, by 3 dB or more.

In the conventional example shown in FIG. 2, PIN diodes 8, 9 are used in the branch circuit to vary the degree of coupling with regular receiver 3 and protection receiver 4 in order to suppress the signal loss. However, a PIN diode is an active element and hence has a generally high failure rate. In particular, since the branch circuit constitutes a common part at a preceding stage of the regular receiver and the protection receiver, if a failure occurs here, the failure can not be prevented by either the regular receiver or the protection receiver, resulting in serious signal discontinuation trouble. Therefore, using parts having a high failure rate such as a PIN diode in the branch circuit causes the degradation of reliability of the entire system.

SUMMARY OF THE INVENTION

It is an object of the present invention to provide a hot stand-by switching unit of high reliability which is capable of suppressing a signal loss in a high-frequency branch circuit on the signal receiving side.

The hot stand-by switching unit of the present invention comprises a branch circuit consisting of a coupler and a high-frequency switching unit on the input side of a regular receiver and a protection receiver.

In the above hot stand-by switching unit, received signals are branched by the coupler into a high level loss output and a low level loss output, then outputted to the regular receiver and the protection receiver through the high-frequency switching unit. At this time, the high-frequency switching unit performs signal switching so that low level loss output of the coupler is supplied to the receiver which is selected for the output by the control circuit and high level loss output of the coupler is supplied to the receiver which is not selected for the output by the control circuit.

Therefore, of the regular and protection receivers, the receiver which is selected for the signal output is always supplied with signals received from the low level loss output of the coupler.

According to the present invention, by using the coupler for branching high-frequency signals and controlling the high-frequency switching unit so that an output signal with low level loss is inputted to the receiver which has been selected for the output, the high frequency signal loss on the receiving side of the hot stand-by switching unit can be suppressed to be lower than that obtained through branching performed by the hybrid unit, thereby preventing the degradation of performance of the signal receiving system. In addition, since the high-frequency branch circuit consists of a coupler, mechanical parts and a simpler electric circuit, a hot stand-by switch unit with high reliability can be obtained.

The above and other objects, features and advantages of the present invention will become apparent from the following description with reference to the accompanying drawings which illustrate examples of the present invention.

DESCRIPTION OF THE PREFERRED EMBODIMENT

Figure 1:
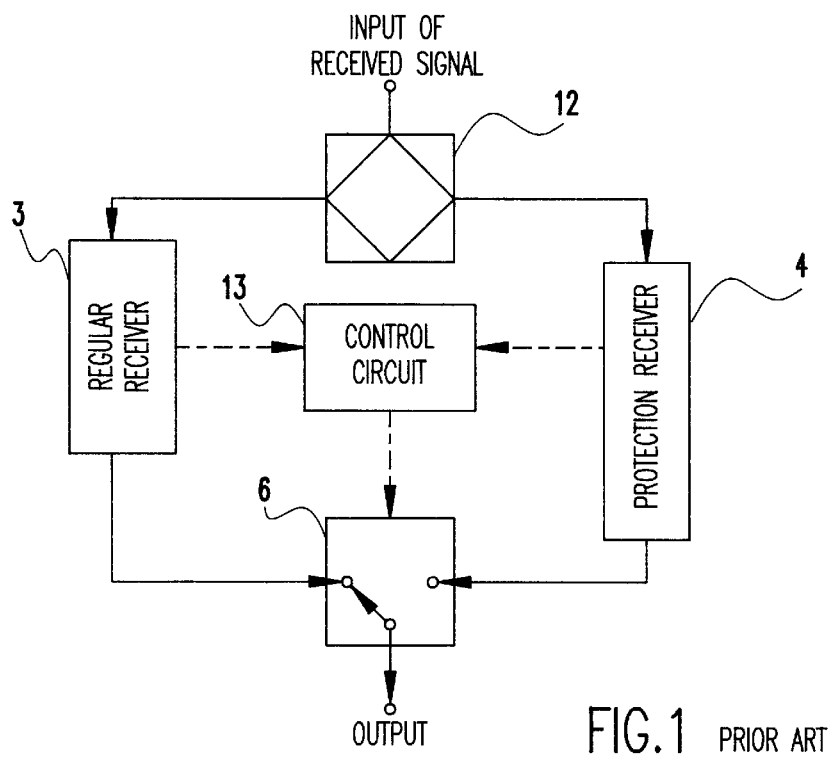
FIG. 1 is a circuit diagram of an example of a conventional hot stand-by switching unit.
Figure 2:
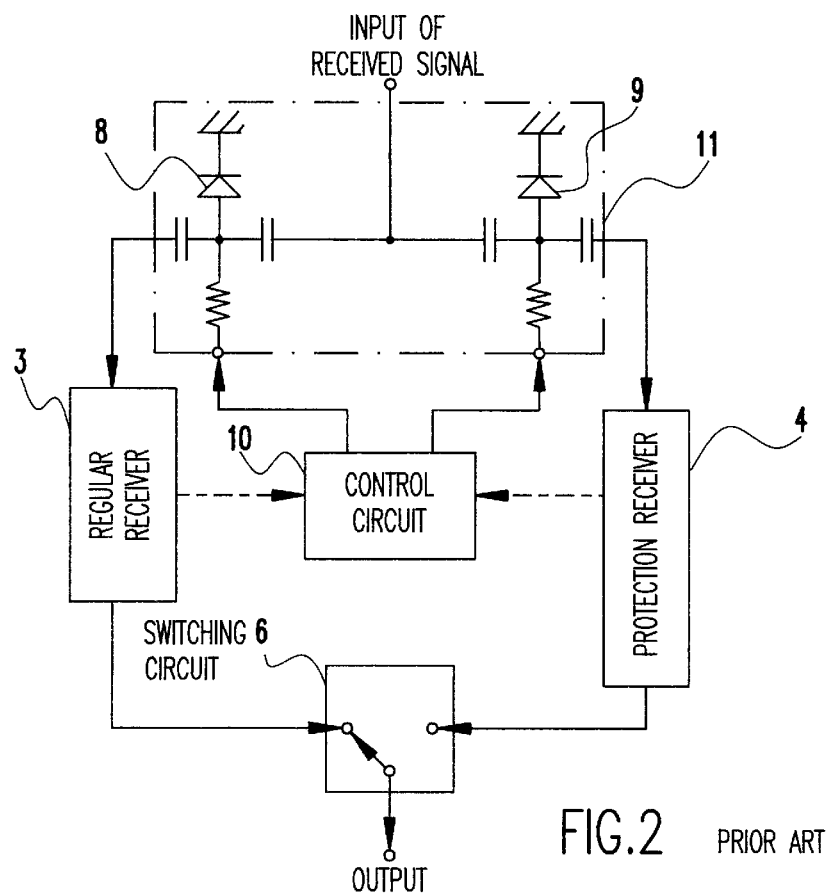
FIG. 2 is a circuit diagram of another example of the conventional hot stand-by switching unit.
Figure 3:
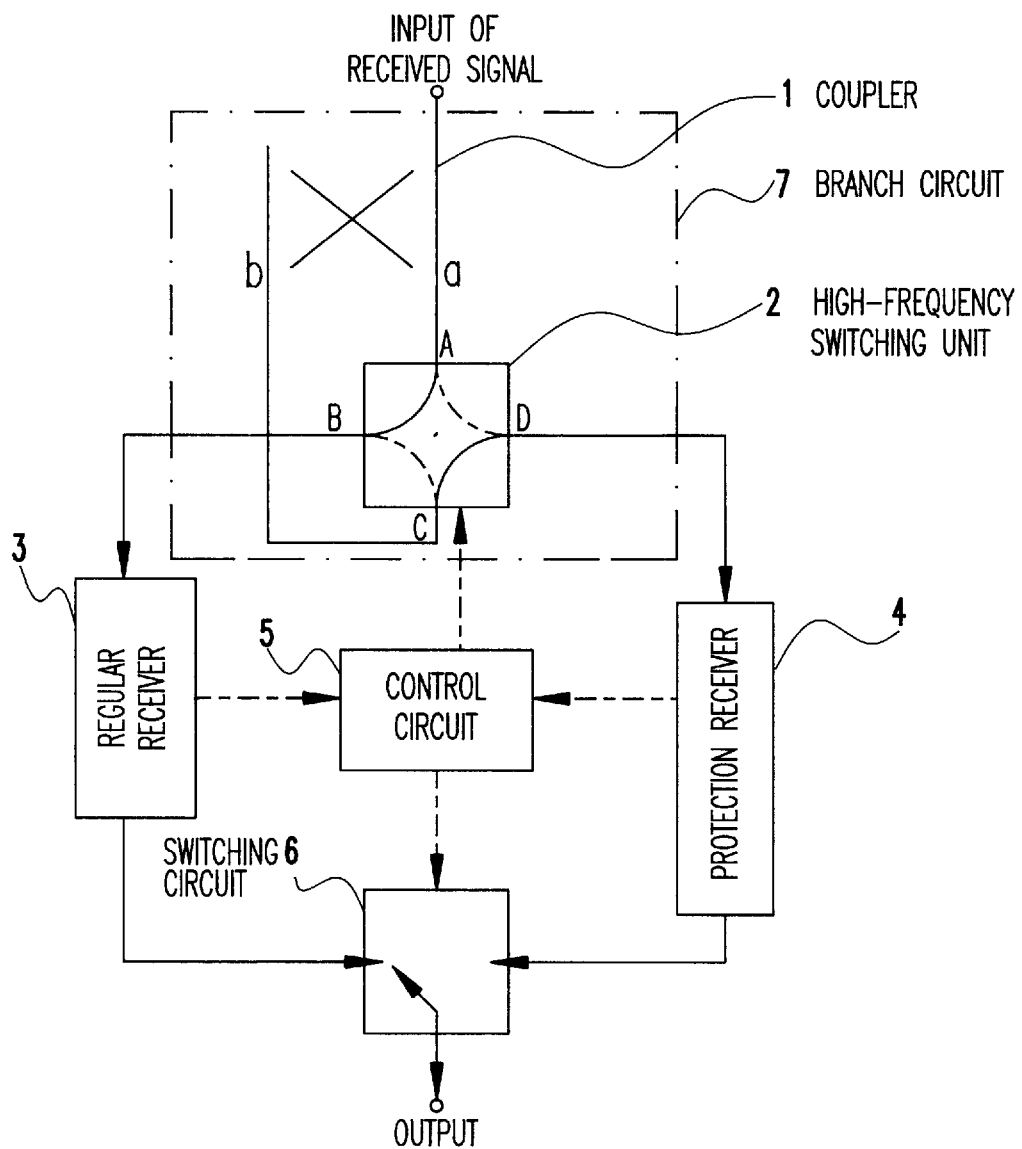
FIG. 3 is a circuit diagram of an embodiment of the hot stand-by switching unit according to the present invention.

Referring now to FIG. 3, an embodiment of a hot stand-by switching unit according to the present invention consists of a branch circuit 7, a switching circuit 6 and a control circuit 5.

Branch circuit 7 consists of a coupler 1 and a high-frequency switching unit 2. Switching circuit 6 outputs an output from either regular receiver 3 or protection receiver 4. Control circuit 5 monitors conditions of regular receiver 3 and protection receiver 4, and controls switching circuit 6 and high-frequency switching unit 2 or in such a way that when regular receiver 3 is normal, switching circuit 6 selects the output of regular receiver 3, high-frequency switching unit 2 supplies the low level loss output "a" of coupler 1 to regular receiver 3 and the high level loss output "b" of coupler 1 to protection receiver 4, respectively, and when regular receiver 3 breaks down, switching circuit 6 selects the output of protection receiver 4, high-frequency switching unit 2 supplies the low level loss output "a" of coupler 1 to protection receiver 4 and the high level loss output "b" of coupler 1 to regular receiver 3, respectively;

Next, the operation of the present embodiment will be described.

Received signals are branched by coupler 1, and outputted as output "a" which is the low level loss and output "b" which is the high level loss, respectively. The circuit is arranged so that, for example, a signal passing loss of high level loss output "b" is about 10 dB and a signal loss of low level loss output "a" is as low as about 0.5 dB. High-frequency switching unit 2 switches signals so that low level loss output "a" of coupler 1 is supplied to regular receiver 3 or protection receiver 4 which has been selected by control circuit 5. In other words, when regular receiver 3 is normal and switching circuit 6 on the output side selects regular receiver 3, high-frequency switching unit 2 connects terminals A and B, C and D, respectively, and connects low level loss output "a" of coupler 1 to regular receiver 3, high level loss output "b" of coupler 1 to protection receiver 4, respectively. Through the above process, received signals of the low level loss are inputted to the selected regular receiver 3, thereby enabling the signal receiving system to suppress the performance degradation which may be caused by the branching of signals to a minimum. In addition, by inputting received signals of the high level loss to protection receiver 4, self monitoring by the receiver itself is secured.

When regular receiver 3 breaks down, control circuit 5 activates switching circuit 6 based on the monitor signal of regular receiver 3 to select the output of protection receiver 4. At the same time, control circuit 5 controls high-frequency switching unit 2 to connect terminals A and D, B and C of the high-frequency switching unit, respectively. As a result, received signals of a small loss are inputted to the selected protection receiver 4, and accordingly, similar to the above, performance degradation of the signal receiving system which may be caused by branching signals can be suppressed to a minimum.

While a preferred embodiment of the present invention has been described using specific terms, such description is for illustrative purposes only, and it is to be understood that changes and variations may be made without departing from the spirit or scope of the following claims.

What is claimed is:

1. A host stand-by switching unit comprising:

a branch means provided at an input side of a regular receiver and a protection receiver, said branch means including a coupler and a high-frequency switching unit both formed from non-active circuit elements;

a switching means for switching and outputting an output of said regular receiver or an output of said protection receiver;

a control means for monitoring conditions of said regular receiver and said protection receiver, and controlling said switching means and said high-frequency switching unit in such a way that, when said regular receiver is normal, said switching means selects the output of said regular receiver, and said high-frequency switching unit supplies a low loss output of said coupler to said regular receiver and a the high loss output of said coupler to said protection receiver, and when said regular receiver breaks down, said switching means selects the output of said protection receiver, and then said high-frequency switching unit supplies the low loss output of said coupler to said protection circuit and connects the high loss output of said coupler to said regular receiver.

2. A hot stand-by switching unit according to claim 1, wherein a signal passing loss of said high loss output is approximately 10 dB a signal passing loss of said low loss output is about 0.5 dB.

3. A host stand-by switching unit comprising:

a branch circuit which branches an input signal into a low loss output and a high loss output, said branch circuit being provided at an input side of a regular receiver and a protection receiver and including a coupler and a high-frequency switching unit, said coupler and high-frequency switching unit being formed from non-active circuit elements;

a switching circuit for switching and outputting an output of said regular receiver or an output of said protection receiver;

a control circuit for monitoring conditions of said regular receiver and said protection receiver, and controlling said switching circuit and said high-frequency switching unit in such a way that when said regular receiver is normal, said switching circuit selects the output of said regular receiver and said high-frequency switching unit supplies a low loss output of said coupler to said regular receiver and a high loss output of said coupler to said protection receiver, and when said regular receiver breaks down, said switching circuit selects the output of said protection receiver, and then said high-frequency switching unit supplies the low loss output of said coupler to said protection circuit and connects the high loss output of said coupler to said regular receiver.

* * * * *